(12) United States Patent
Sluijter et al.

(10) Patent No.: US 9,073,594 B2
(45) Date of Patent: Jul. 7, 2015

(54) MOTORIZED FOLDABLE SCOOTER

(75) Inventors: Robert Hugo Sluijter, Overveen (NL); Camille Wilhelmus Van Den Brande, Haarlem (NL); Simon James Hemmingway Wilkinson, Leiderdorp (NL)

(73) Assignee: C10 Ventures B.V., Haarlem (NL)

( * ) Notice: Subject to any disclaimer, the term of this patent is extended or adjusted under 35 U.S.C. 154(b) by 0 days.

(21) Appl. No.: 12/896,379

(22) Filed: Oct. 1, 2010

(65) Prior Publication Data

US 2011/0024217 A1 Feb. 3, 2011

Related U.S. Application Data

(63) Continuation-in-part of application No. PCT/EP2009/053732, filed on Mar. 30, 2009.

(30) Foreign Application Priority Data

Apr. 3, 2008 (EP) ..................................... 08103361

(51) Int. Cl.
  *B62K 19/00* (2006.01)
  *B62K 15/00* (2006.01)
  *B62K 11/10* (2006.01)

(52) U.S. Cl.
  CPC ............... *B62K 15/006* (2013.01); *B62K 11/10* (2013.01); *B62K 2202/00* (2013.01); *B62K 2204/00* (2013.01)

(58) Field of Classification Search
  CPC .......................... B62K 15/006; B62K 2202/00
  USPC ................. 180/208, 218, 219, 227, 229, 231; 280/287, 278
  See application file for complete search history.

(56) References Cited

U.S. PATENT DOCUMENTS 2,111,691 A * 3/1938 Salsbury ....................... 180/231
2,594,034 A   4/1952 King
3,513,926 A * 5/1970 Paget, Jr. ....................... 180/208
(Continued)

FOREIGN PATENT DOCUMENTS

EP  0229597  7/1987
EP  0905014  8/1998
(Continued)

OTHER PUBLICATIONS

Written Opinion of the European Patent Office in counterpart foreign application No. PCT/EP2009/053732 filed Mar. 30, 2009.
(Continued)

*Primary Examiner* — Karen Beck
(74) *Attorney, Agent, or Firm* — Steven M. Koehler; Westman, Champlin & Koehler, P.A.

(57) ABSTRACT

A motorized foldable scooter has a frame, at least a front and rear wheel connected to the frame, a seat supported by the frame, a steering arrangement for the front wheel, and an electric motor, driving the rear wheel through a transmission. The frame has at least front and rear frame parts movably connected through a substantially vertical rotary axis to move the frame parts between an extended position of use and a collapsed resting position. The steering arrangement and the seat, and/or the front and rear frame parts are shaped such with respect to each other and the rotary axis that they at least partly nest in lateral direction of the scooter when the frame parts are in the collapsed resting position.

19 Claims, 19 Drawing Sheets

(56) References Cited

U.S. PATENT DOCUMENTS

| | | | | |
|---|---|---|---|---|
| 3,542,145 | A * | 11/1970 | Proffer | 180/219 |
| 3,631,936 | A * | 1/1972 | Schweser | 180/227 |
| 3,710,883 | A | 1/1973 | Rizzo | |
| 4,462,606 | A * | 7/1984 | Hon | 280/278 |
| 4,712,629 | A * | 12/1987 | Takahashi et al. | 180/68.1 |
| 4,718,688 | A * | 1/1988 | Sanders | 280/278 |
| 4,732,403 | A | 3/1988 | Grattapaglia | |
| 5,029,666 | A * | 7/1991 | Baldoni | 180/208 |
| 5,590,895 | A * | 1/1997 | Hiramoto | 280/278 |
| 5,779,254 | A * | 7/1998 | James et al. | 280/291 |
| 5,782,313 | A * | 7/1998 | Kurawaki et al. | 180/219 |
| 6,267,401 | B1 * | 7/2001 | De Jong | 280/287 |
| 6,270,103 | B1 * | 8/2001 | Grimm | 280/270 |
| 6,739,421 | B1 * | 5/2004 | Miya | 180/220 |
| 6,986,522 | B2 | 1/2006 | Sinclair et al. | |
| 7,182,167 | B2 * | 2/2007 | Sasamoto | 180/219 |
| 7,614,380 | B2 * | 11/2009 | Tsutsui et al. | 123/184.57 |
| 7,882,918 | B2 * | 2/2011 | Chin et al. | 180/208 |
| 8,226,104 | B2 * | 7/2012 | Kulikov et al. | 280/287 |
| 2006/0175797 | A1 * | 8/2006 | Sanders | 280/287 |
| 2006/0283649 | A1 * | 12/2006 | Nakanishi | 180/227 |
| 2007/0051548 | A1 * | 3/2007 | Kosco et al. | 180/208 |
| 2008/0053394 | A1 * | 3/2008 | Tsutsui et al. | 123/184.21 |
| 2009/0184483 | A1 * | 7/2009 | Steinberg | 280/87.041 |
| 2010/0081536 | A1 * | 4/2010 | Braford, Jr. | 475/303 |
| 2011/0024217 | A1 * | 2/2011 | Sluijter et al. | 180/208 |
| 2012/0043148 | A1 * | 2/2012 | Brady et al. | 180/206.5 |
| 2012/0061942 | A1 * | 3/2012 | Kulikov et al. | 280/287 |

FOREIGN PATENT DOCUMENTS

| | | | |
|---|---|---|---|
| ES | 2028615 | | 7/1992 |
| GB | 677034 | | 8/1952 |
| GB | 790673 | | 2/1958 |
| GB | 2111443 | | 7/1983 |
| JP | 01237278 | | 9/1989 |
| JP | 05238456 | A * | 9/1993 |
| JP | 11005582 | | 1/1999 |
| JP | 11105758 | | 4/1999 |
| JP | 2001 071977 | | 3/2001 |
| JP | 2001506947 | | 5/2001 |
| JP | 2007008418 | | 7/2001 |
| JP | 2001278161 | A * | 10/2001 |
| JP | 2001322585 | | 11/2001 |
| JP | 3103452 | | 6/2004 |
| JP | 2005112126 | | 4/2005 |
| JP | 2005335673 | | 12/2005 |
| JP | 2006327237 | | 12/2006 |
| JP | 2004338710 | | 2/2012 |
| RU | 2091266 | | 9/1997 |

OTHER PUBLICATIONS

Official Search Report of the European Patent Office mailed May 18, 2009 in counterpart international application filed Mar. 30, 2009, and assigned Serial No. PCT/EP2009/053732.

Notice of Reasons for Rejection, mailed Jun. 18, 2013 for JP Application No. 2011-052631.

* cited by examiner

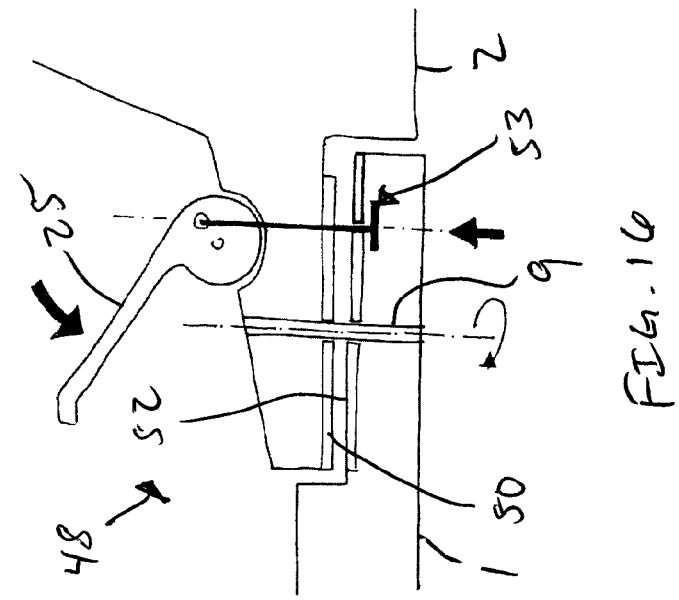
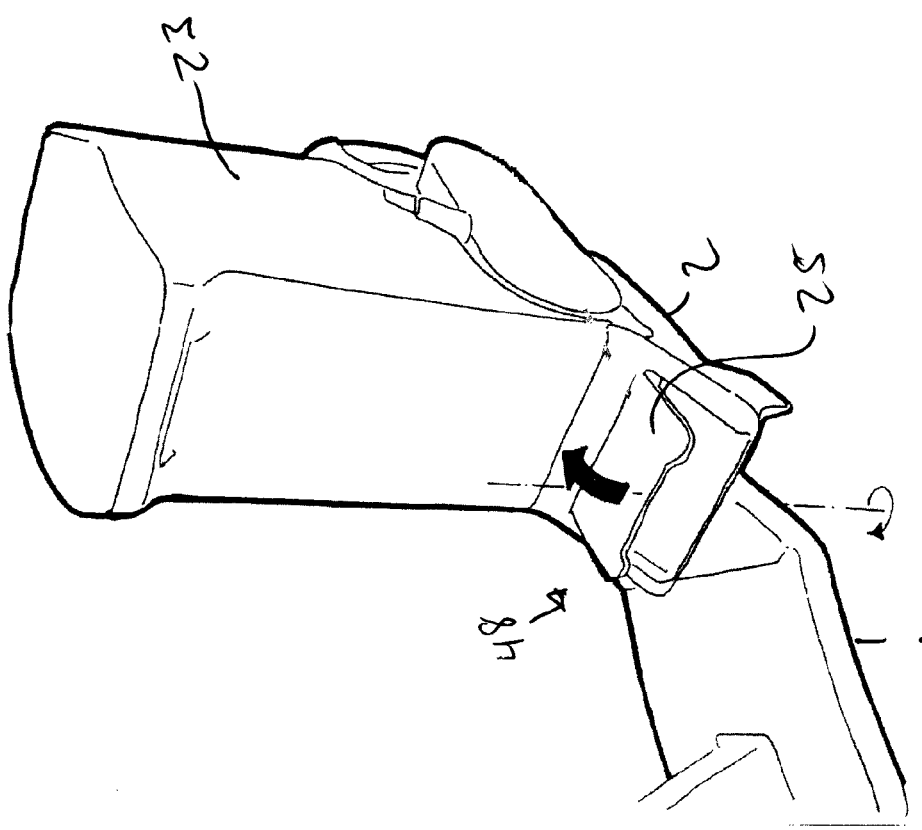
FIG. 16
FIG. 15

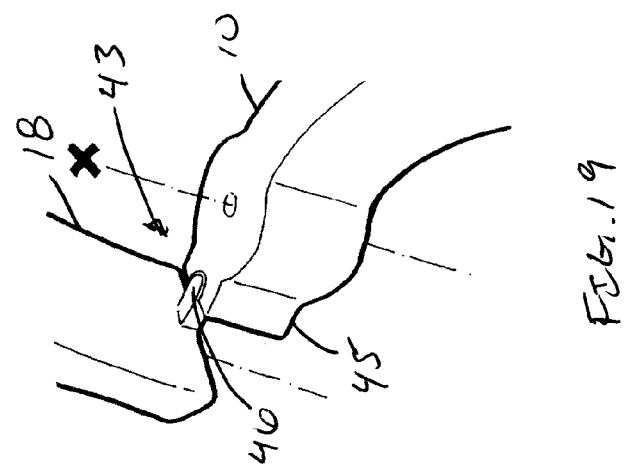
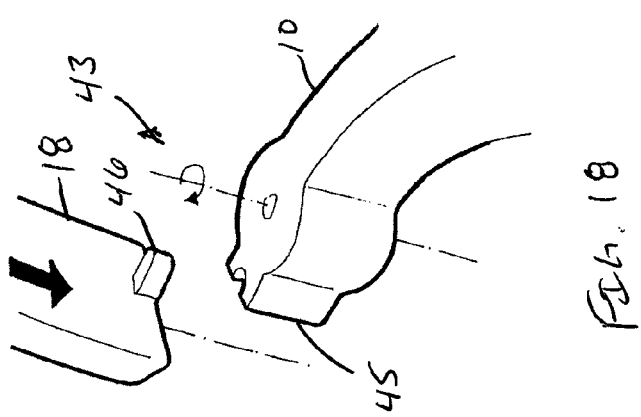
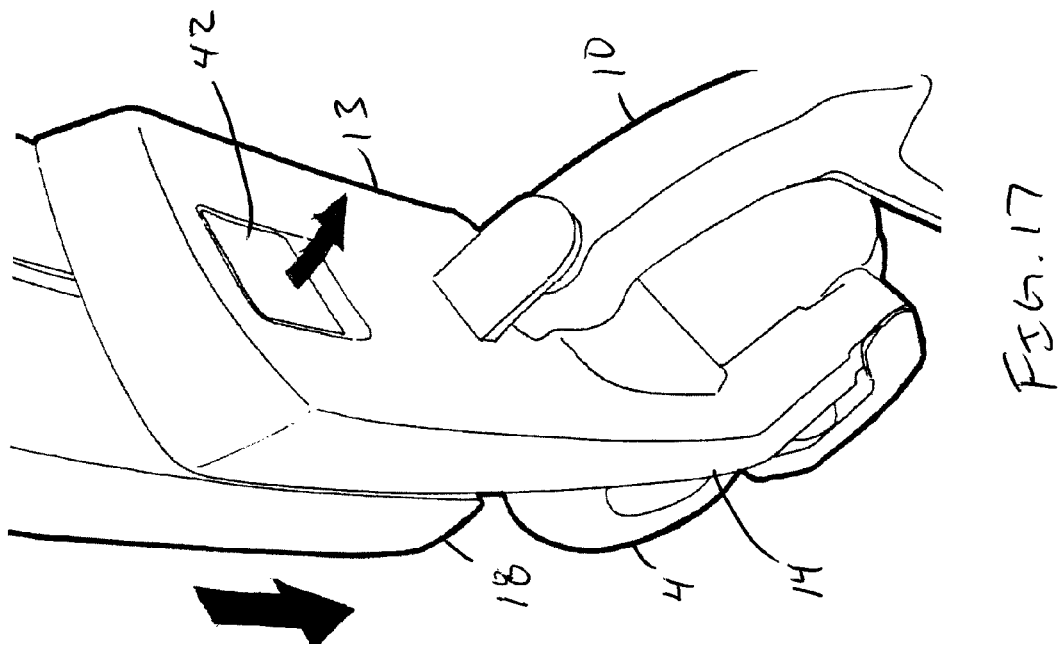

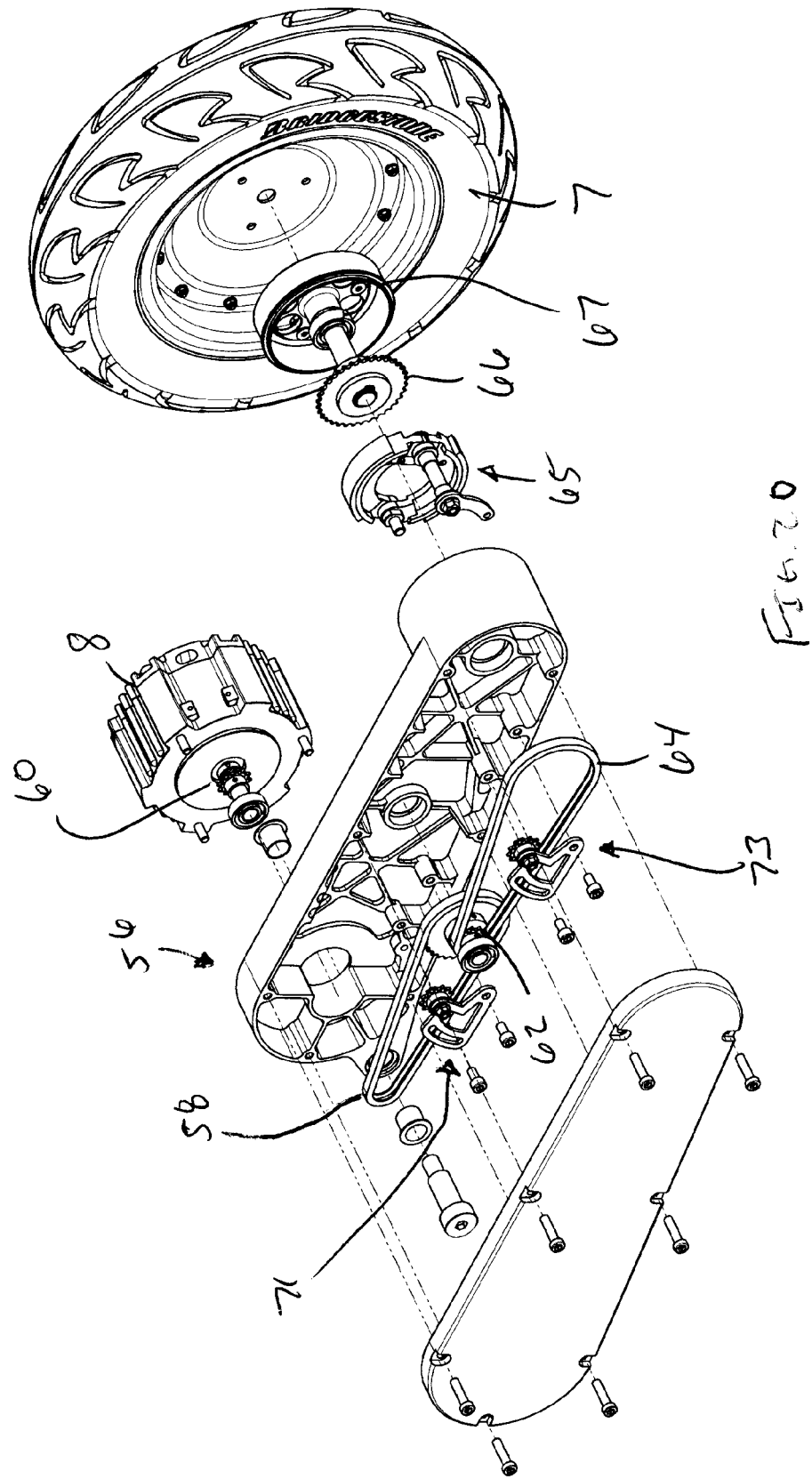

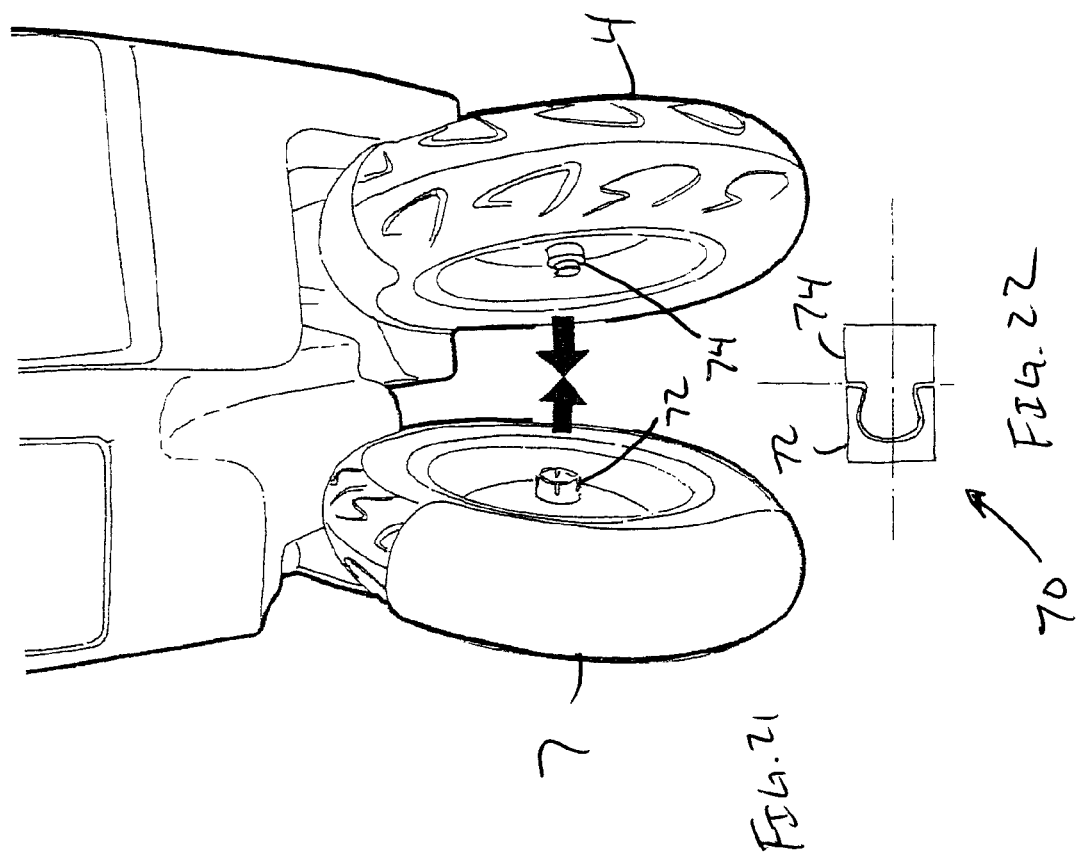

MOTORIZED FOLDABLE SCOOTER

CROSS-REFERENCE TO RELATED APPLICATION

This application is a continuation-in-part under 35 U.S.C. Section 120 of International Application PCT/EP2009/053732 filed Mar. 30, 2009 and published as WO 2009/121832 in English, the content of which is incorporated herein by reference in its entirety.

BACKGROUND

The discussion below is merely provided for general background information and is not intended to be used as an aid in determining the scope of the claimed subject matter.

Aspects of the present invention relate to a motorized foldable scooter having a frame, at least a front and rear wheel connected to the frame, a seat supported by the frame, a steering arrangement for the front wheel, and a motor, preferably an electric motor, driving the rear wheel through a transmission, the frame having at least front and rear frame parts movably connected to a substantially vertical rotary axis to move the frame parts between an extended position of use and a collapsed resting position.

Nowadays, rush hour traffic becomes a greater problem every year, especially on the roads. Therefore the public transport is promoted to decrease the problems on the roads. The disadvantage of public transport is that it is not a door-to-door transport which is considered by many people to be most convenient. Therefore, mixed transport is promoted, wherein part of the distance is covered by individual means of transport and the main distance is traveled by public transport, for example by train. The foldable bike is a means of transport which enables mixed transport in a convenient manner if the distance from the starting point or the final destination to a train station is relatively small. For larger distances, the bicycle trip is either too tiring or takes up too much time in the total travel. Motorized bicycles are a step forward but good foldable motorized bicycles are not available yet.

On the other hand, motorized scooters are a popular means of transport, especially with the youth and it would be favorable if a motorized scooter could be developed which is foldable in a compact way so as to be easily stowed during public transport or at the final destination.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

The scooter according to an aspect of the invention has a steering arrangement and a seat, and/or a front and rear frame parts are shaped such with respect to each other and a rotary axis that they at least partly nest in lateral direction of the scooter when the frame parts are in the collapsed resting position.

Due to this nesting, the main disadvantage of a scooter with respect to a bicycle, that is its width, is neutralized. If the nesting is done in an effective way, the total width of the folded scooter is only slightly larger than the width of the scooter in its position of use. This makes the scooter very compact in its collapsed position, not only by halving the length of the scooter but also by keeping the width of the scooter within acceptable limits.

Favorable manners of facilitating the collapsing or enabling the compact nesting of the bicycle in the collapsed position are defined in claim 2.

The embodiment of claim 3 allows the use of the scooter as a seat when it is in its collapsed position. This is very favorable if the user has to wait, for example for his public transport, such as the train. The user has then already collapsed the scooter to enter the train, but in this position he/she may use it as a seat during the waiting time. The shape of the seat enables a comfortable seating position, which cannot be obtained by a bicycle saddle.

The feature of claim 4 facilitates collapsing because the front frame part and the steering arrangement including the front wheel act as a unit, so that only two rigid parts have to be folded and no attention has to be paid to the position of the steering arrangement during collapsing. It is favorable if the steering arrangement can be locked by a downward movement of the handle bars because this combines two functions in one action: the reducing of the size of the scooter in a vertical direction and the locking of the steering arrangement.

The features of claim 5 enable the user to roll the collapsed scooter on the ground, which is of course much more comfortable than carrying the relatively heavy scooter. If the transmission of the driven rear wheel does not have a free wheel clutch that allows for free forward and reverse rotation of the rear wheel when the motor is not engaged, the alternative feature of claim 5 still enables the rolling of the scooter in an inclined position. Then, in the forwardly inclined position only the front wheel, which is slightly projecting beyond or below the rear wheel, is touching the ground and of course this front wheel is freely running. The grip between the handle bars enables the user to bring and hold the scooter in this forwardly inclined position.

In case the axis of the wheels are aligned in the collapsed position of the wheel, claim 6 provides a very favorable way of locking the frame parts in the collapsed position by locking the wheel axles with respect to each other. This locking through the axles, instead of through the wheels, makes it possible to use exactly the same wheels for the front and rear wheel, which simplifies production and reduces the number of stock parts.

The feature of claim 7 allows the use of a very high transmission ratio without having to use a very large sprocket wheel or the like on the rear wheel. This reduces the total weight as above a certain transmission ratio the total weight of the three transmission wheels and two endless transmission elements will be lower than that of two transmission wheels and a single endless transmission element.

The feature of claim 8 enables the wheels to be positioned very close to each other in the collapsed position, while the mudguards can still be effective during use of the scooter in wet conditions.

The object of the embodiment according to claim 9 is to provide a safe position for the actuating member for actuating the lock of the rotary axis. This positioning prevents accidental actuation of the actuating member, while it is an easy position to actuate the lock when the scooter is collapsed, because it allows firm gripping of the rear frame part by hand and actuating the actuating member by the same hand. The other hand can be used to grip the front frame part.

This position of the actuating member is of course especially intended for use on a scooter for one person only.

Otherwise, the passenger will use the handgrip behind the seat when the scooter is used, with the risk of actuating the actuating member.

The embodiment of claim 10 provides a shielding of the exposed hot parts of the engine, thereby preventing contact between the user and the hot parts during collapsing or when the scooter is in the collapsed position.

BRIEF DESCRIPTION OF THE DRAWINGS

Aspects of the invention will appear from the following description with reference to the drawings showing an embodiment of the scooter by way of example.

FIGS. 15 and 16 are schematic views of a locking device for selectively locking frame parts in at least an aligned position.

FIGS. 17, 18 and 19 are schematic views of a locking device for selectively locking a steering arrangement.

FIG. 20 is an exploded view of a transmission and rear wheel assembly.

FIGS. 21 and 22 are schematic views of a locking device for selectively locking frame parts in a collapsed or nested position.

DETAILED DESCRIPTION OF THE ILLUSTRATIVE EMBODIMENTS

Figure 1:
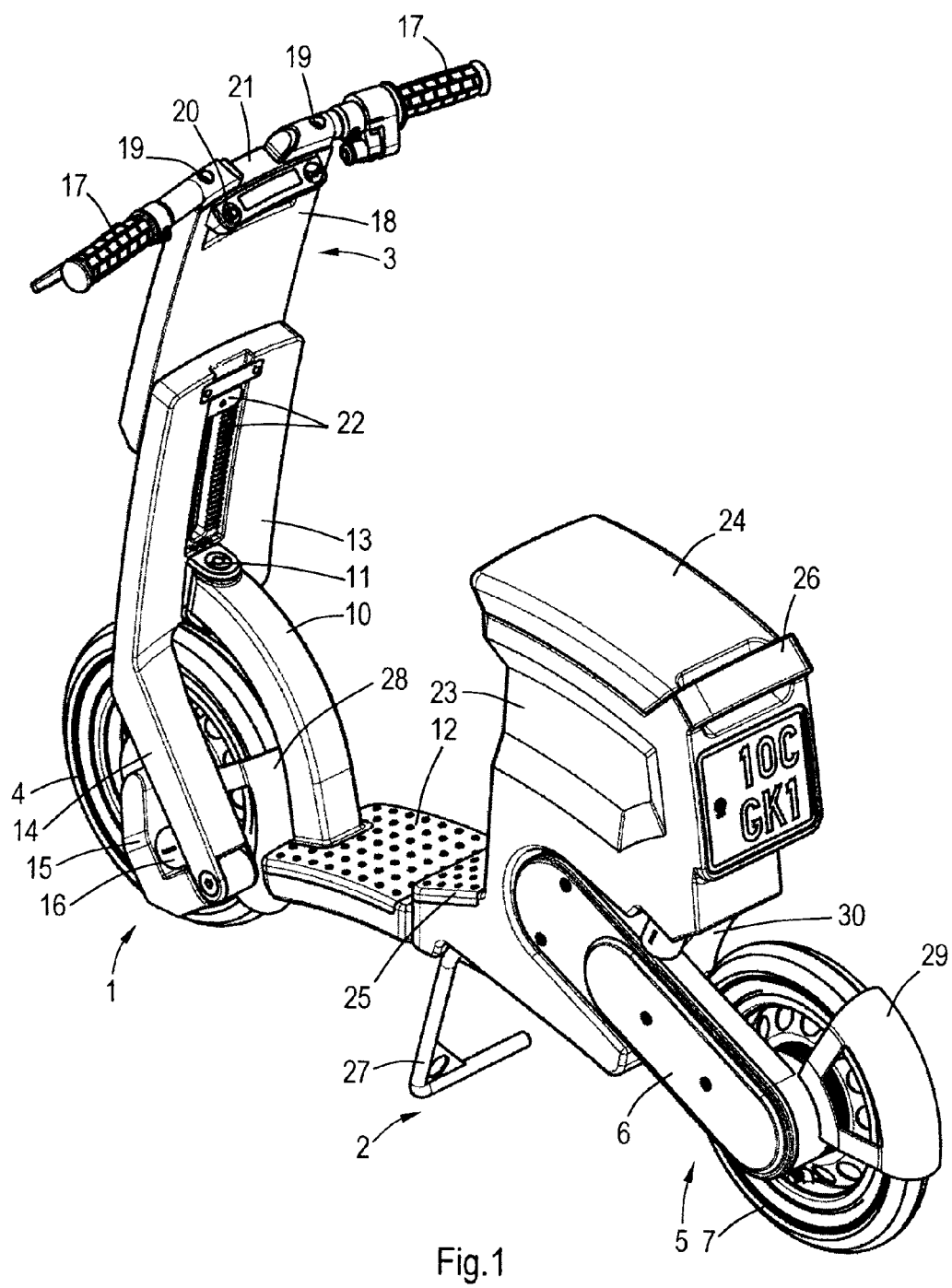
FIG. 1 is a perspective view of an embodiment of the motorized foldable scooter, as seen from the left rear side.
Figure 2:
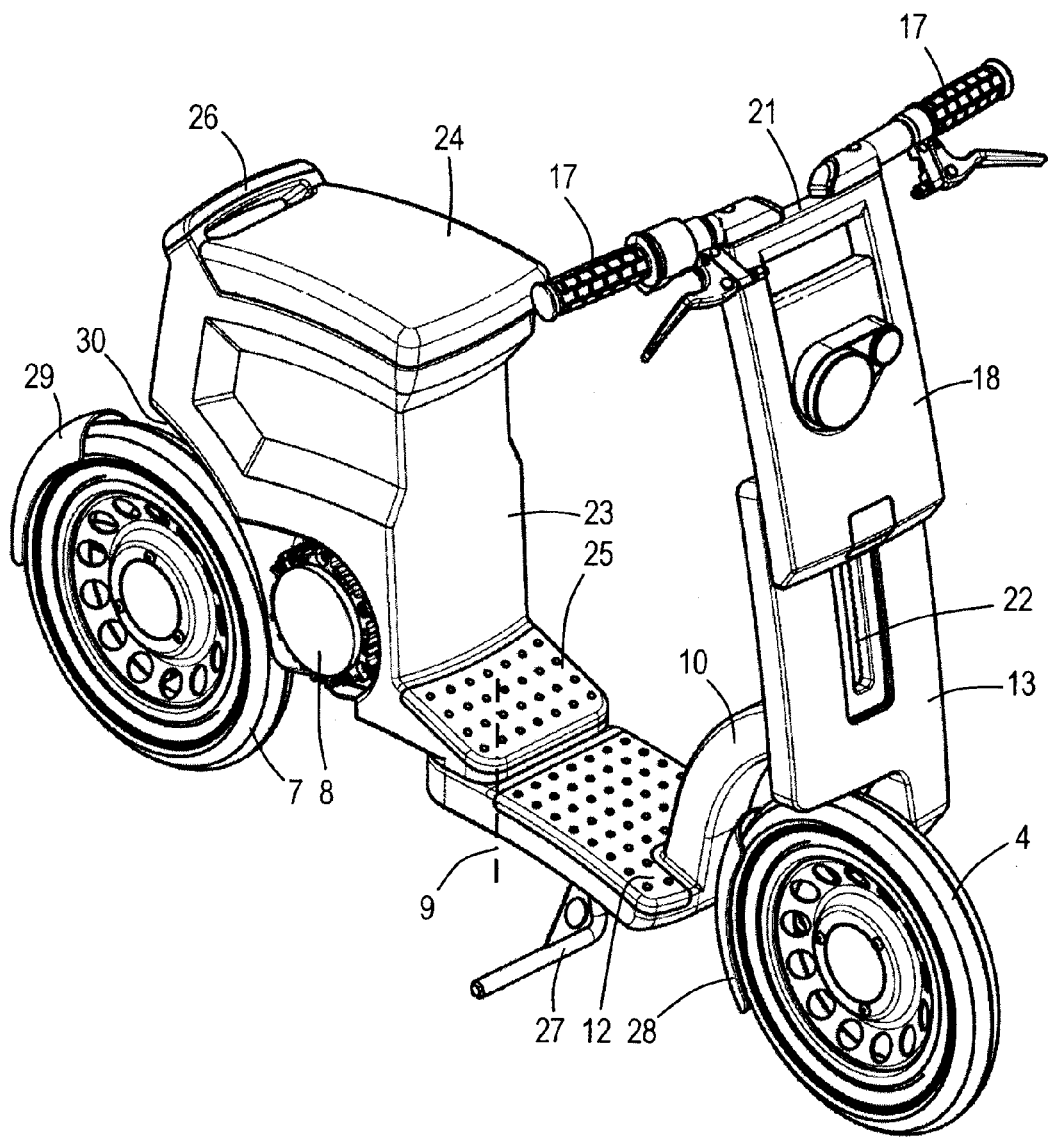
FIG. 2 is a perspective view of the scooter of FIG. 1 as seen from the front right side.
Figure 3:
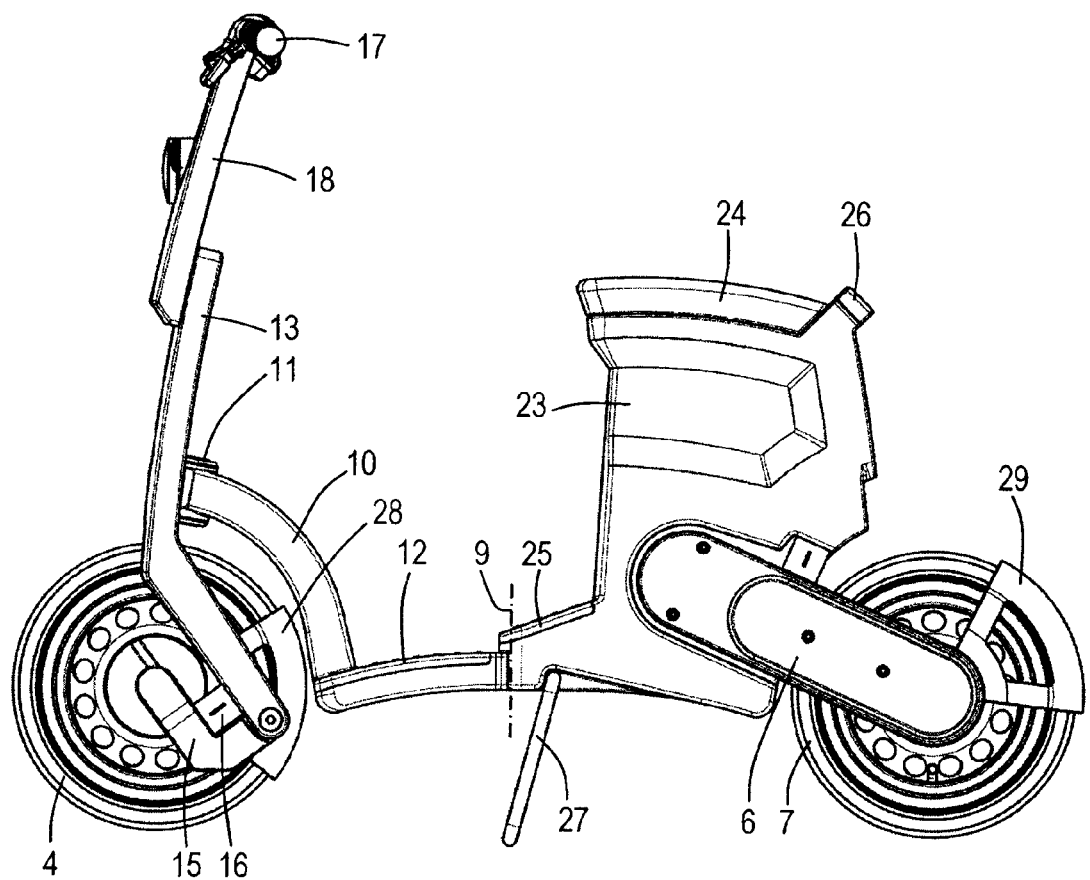
FIGS. 3, 4 and 5 are side, plan and front views, respectively, of the scooter of FIG. 1.
Figure 4:
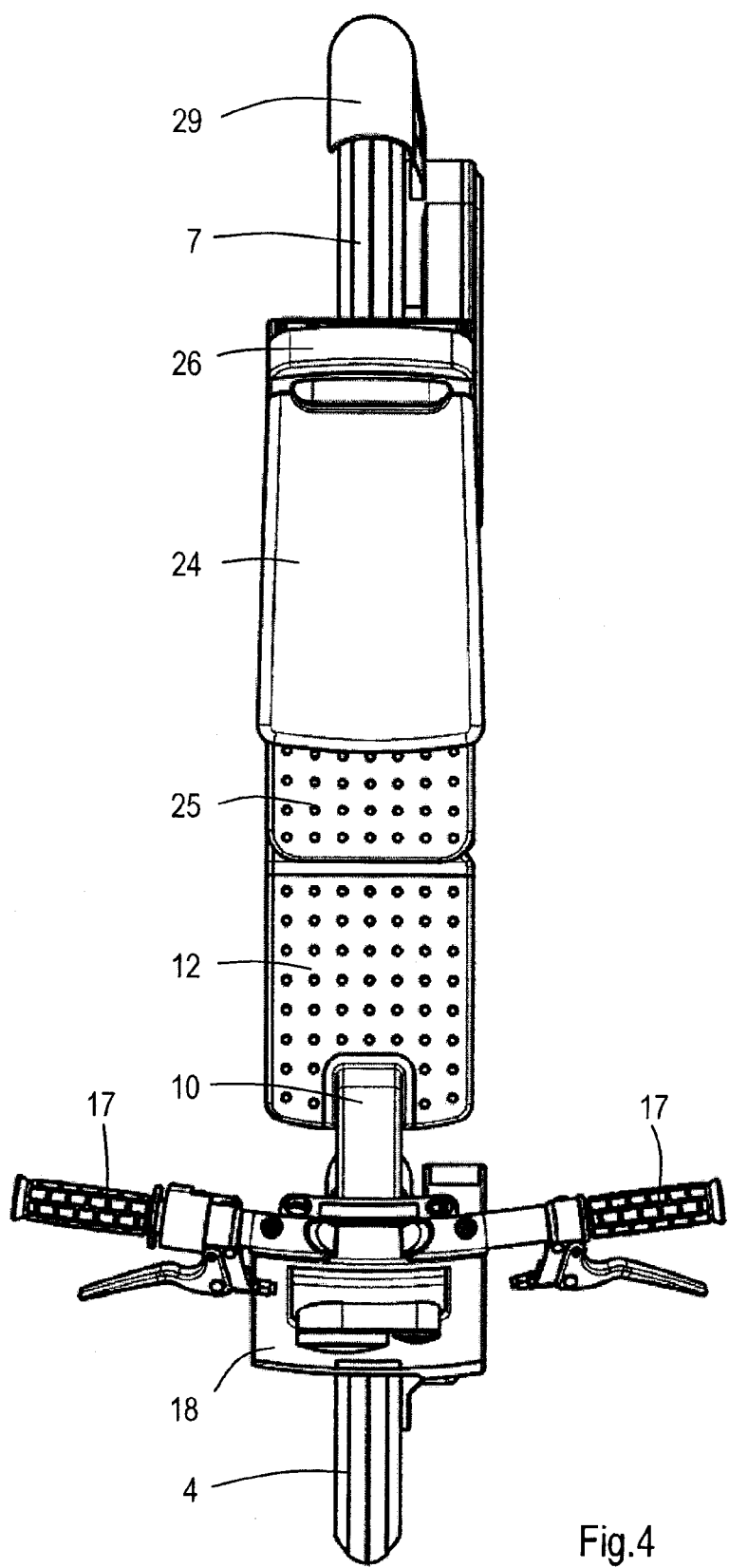
Figure 5:
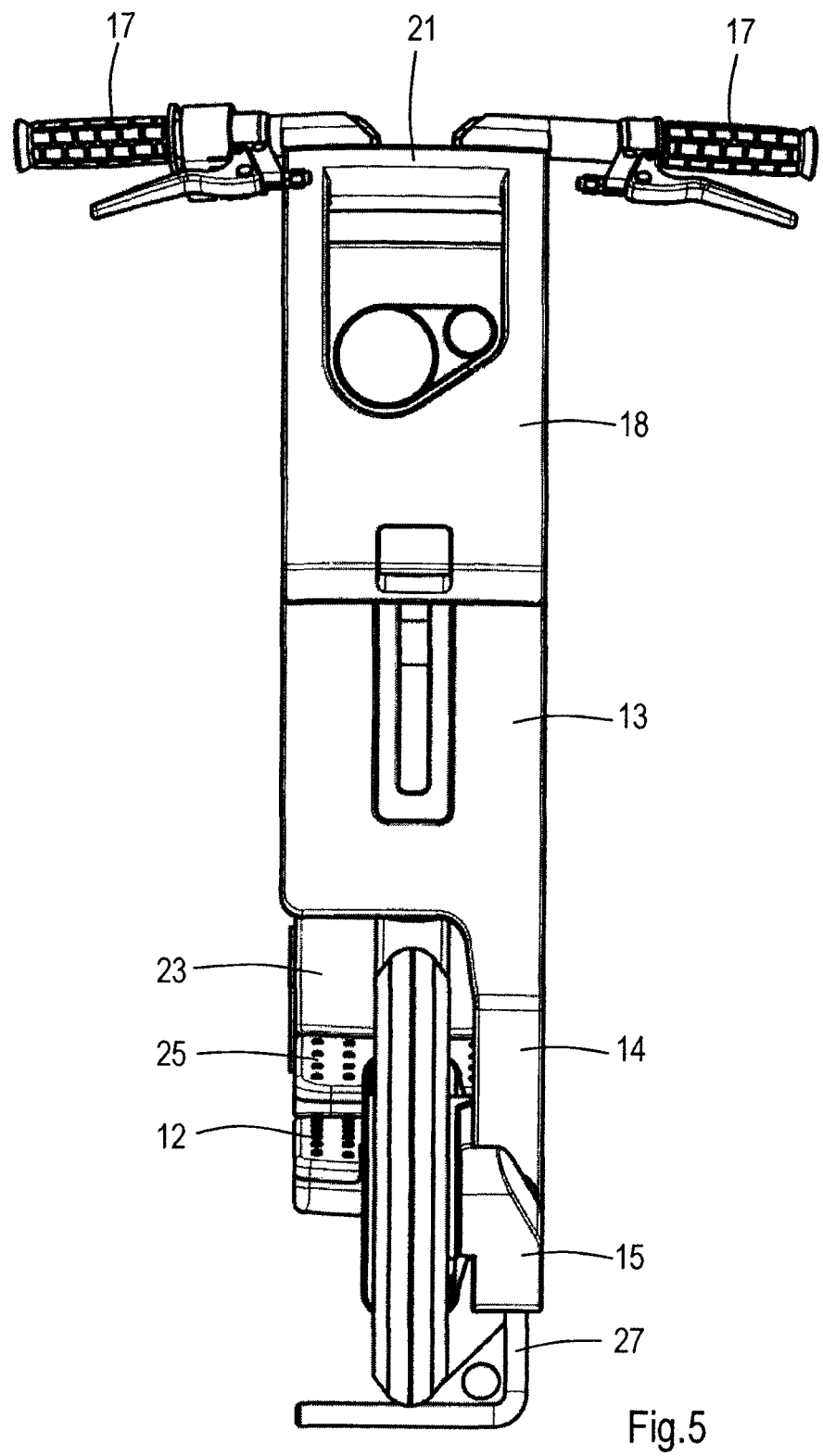

The drawings show an embodiment of a foldable scooter, which is driven by an electric motor, although it is conceivable that the scooter is driven by a different type of motor, for example an internal combustion engine or other type of motor.

The main parts of the scooter comprise a front frame part 1 and a rear frame part 2. The front frame part 1 supports a steering arrangement 3 carrying a front wheel 4 and the rear frame part 2 supporting a rear wheel suspension 5 and transmission 6, both connected to a rear wheel 7, while the transmission 6 is driven by an electric motor 8 attached to the rear frame part 2. The front frame part 1 and the rear frame part 2 are connected permanently through a substantially vertical rotary axis 9, such as a pin or the like and during use the front and rear frame parts 1, 2 are additionally coupled through a locking device 48 (FIGS. 15 and 16) selectively locking the frame parts 1 and 2 in at least an aligned position where the scooter can be operated and rode. The rotary axis 9 is positioned out-side a longitudinal center line of the scooter 1.

The front frame part 1 includes a front frame beam 10 substantially following the curvature of the front wheel 4 and being provided on its front and with a steering head 11 and being attached to a platform-like foot rest 12 on its rear lower end.

The steering arrangement 3 includes a front fork 13 having only one leg 14 carrying the front wheel suspension 15. This front wheel suspension 15 includes spring and damper means 16.

Figure 10:
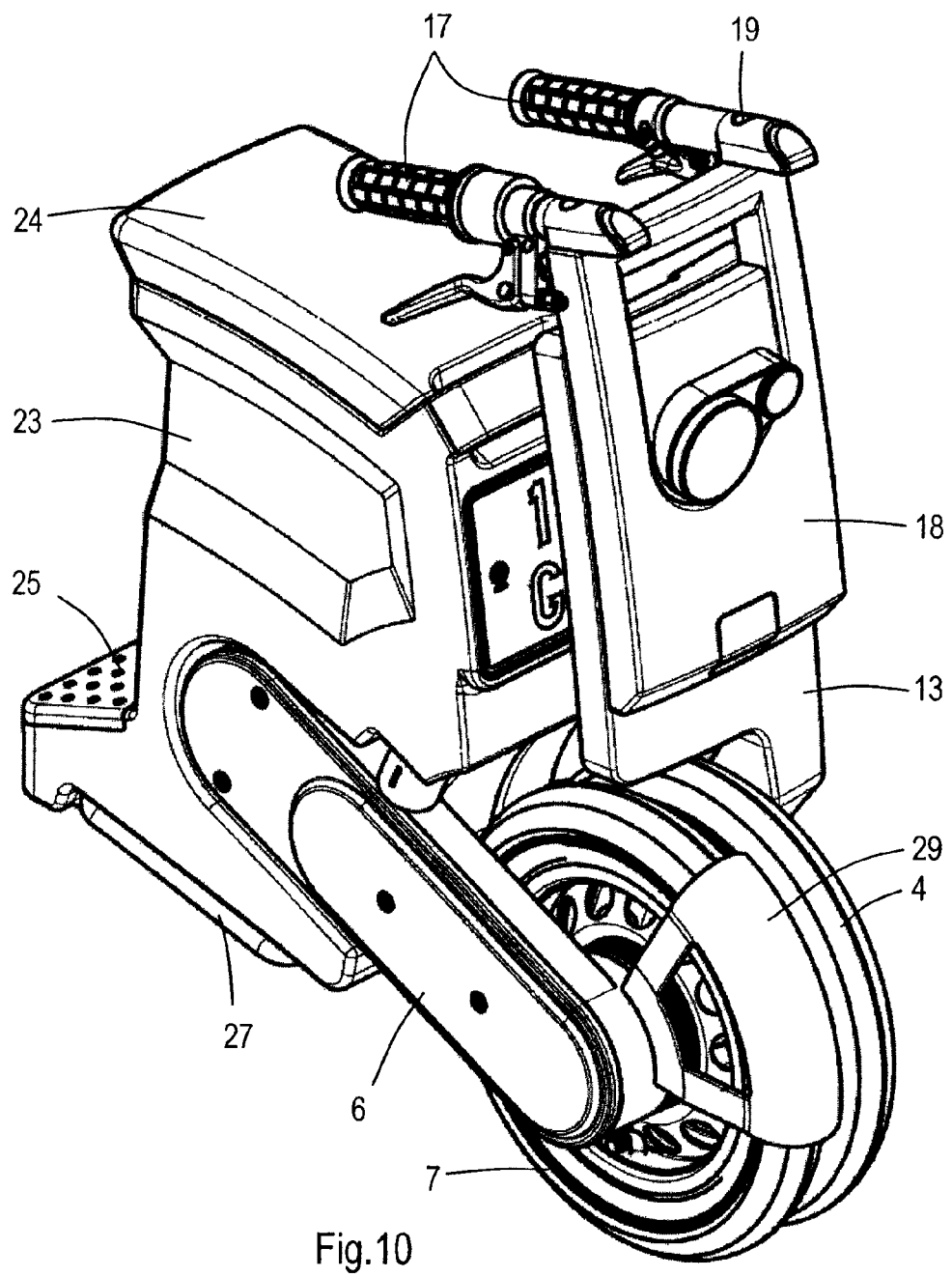
FIG. 10 is a view corresponding to that of FIG. 1, but showing the scooter in the fully collapsed position.
Figure 11:
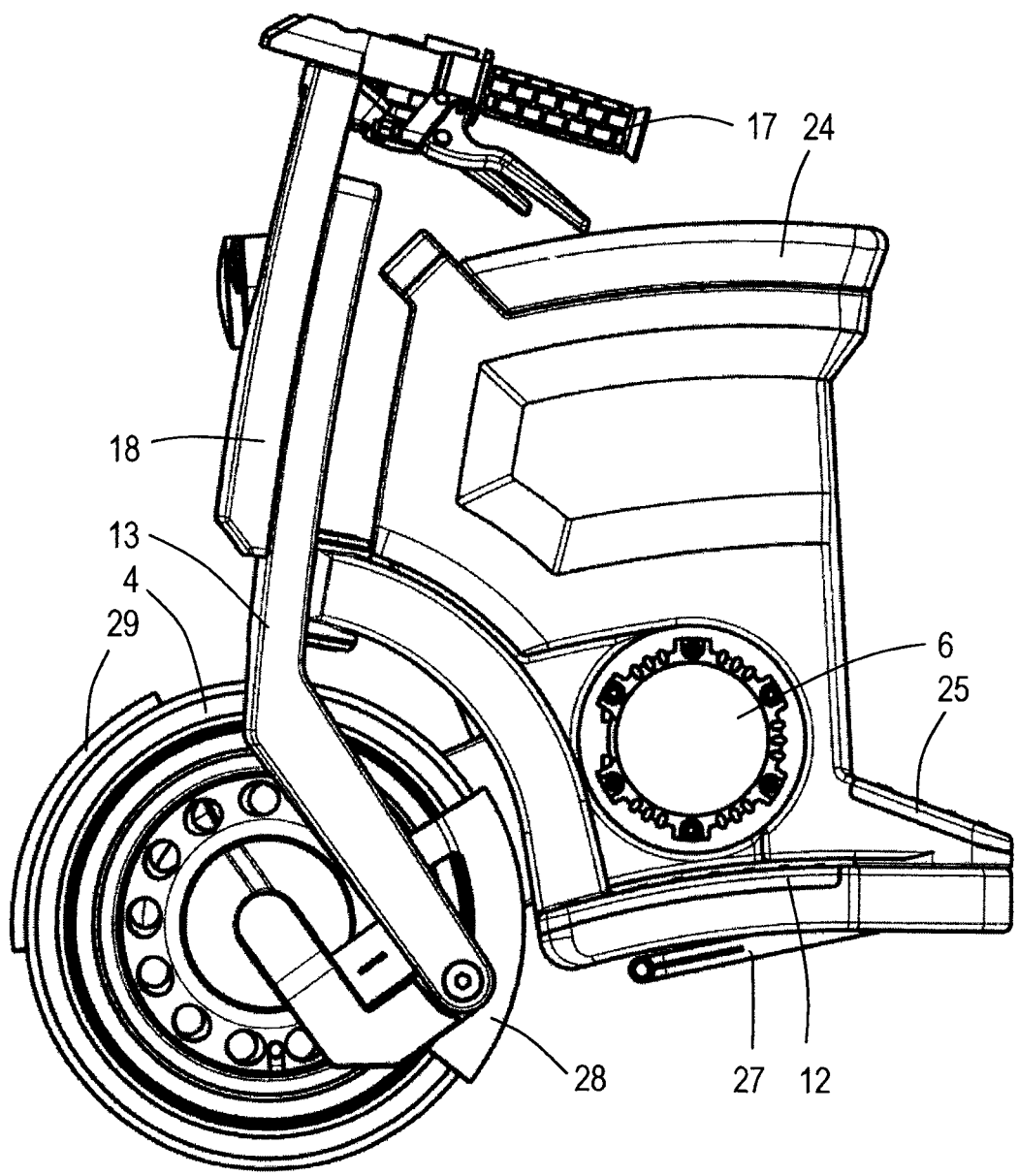
FIGS. 11, 12, 13 and 14 are side, plan, front and rear views respectively, of the scooter of FIG. 1, but in the fully collapsed position.

The steering arrangement 3 further comprises handle bars 17 which are connected to the handle bar support 18. The handle bars 17 are connected to the handle bar support 18 through a substantially vertical pivoting axis 19 and having a locking arrangement 20 to either lock the handle bars 17 in a desired position or allow the handle bars to be rotated around their own pivoting axis 19 to swivel from a position of use as shown in FIG. 1 to a collapsed position as shown in FIG. 10. Of course it would also be conceivable to use the pivoting axis 19 to allow adjustment of the handle bars 17 to the needs of a user to obtain a comfortable position during use. The handle bar support 18 is provided on its upper end between the handle bars 17 with a hand grip 21 which can be used for carrying or rolling the scooter in the collapsed position as will be explained later on.

The handle bar support 18 is connected to the front fork 13 through a height adjustment mechanism 22 or other adjustable connection to allow for a height adjustment of the handle bar support 18 with respect to the front fork 13. This mechanism may for example include a toothed rack and ratchet, but other arrangements are conceivable such as guided sliding surfaces. This height adjustment mechanism 22 may not only be used for moving the handle bar support 18 between a use position and collapsed position, but also for adjusting the height of the handle bars 17 to the needs of the user for a comfortable position during use. Stop may be provided for determining the use position and/or collapsed position of support 18. A locking device 42 (FIG. 17), for example, similar to locking device 48 discussed below or any other form of locking device having selectively engagable elements such but not limited to a movable pin, plate, flanges or the like engaging corresponding apertures or flanges selectively fixes the relative positions of portions 13 and 18.

The up and down movement of the handle bar support 18 may also be used to actuate a locking mechanism 43 for the steering arrangement 3 as illustrated in FIGS. 18 and 19. The locking of the steering arrangement 3 in a central position facilitates the collapsing of the frame parts 1 and 2, because the front frame part 1 and the steering arrangement 3 will then act as a rigid unit. The locking mechanism 43 may for example include a projecting part 45 on the front frame beam 10 and a part 46 on the lower side of the handle bar support 18 coming into engagement with the projecting part 45 in the lower position of the handle bar support 18.

It is clear from the drawings that the handle bar support 18 and the upper portion of the front fork 13 are plate shaped and have a small dimension in the longitudinal direction of the scooter. This can be used for nesting the front and rear frame parts 1 and 2 in the collapsed position of the scooter.

The rear frame part 2 has a box shaped housing or carries a housing having a box shape. This housing 23 carries on top a cushioned seat 24 which is substantially rectangular and has a convenient width and length to provide a comfortable seat. At the front of the housing 23 near the lower end thereof is a rear extension 25 of the foot rest 12, which foot rest extension 25 is positioned above the rotary axis 9.

Behind the seat 24 the housing 23 is provided with a hand grip 26 concealing an actuating member (not shown), for example a lever or push button, configured to operate a locking device which locks the front and rear frame part 1, 2 near the rotary axis 9. The locking device includes selectively engagable elements such but not limited to a movable pin, plate, flanges or the like engaging corresponding apertures or flanges. Referring back to FIGS. 15 and 16, an exemplary locking device 48 is illustrated. In this embodiment, locking device 48 includes selectively engagable elements 50, 52 provided on the front frame part 1 and the rear frame part 2, respectively. Selective engagement of the elements 50 and 52 is controlled by a lever 25 or cam that controls displacement of rod or cable end 53. As illustrated, movement of the lever 25 upwardly allows the elements 50 and 52 to disengage from each other and allow relative rotation between the rear frame part 2 and the front frame part. Whereas, movement of the lever 25 downwardly draws the frame parts 1 and 2 via the rod or cable end 53, and thus, the elements 50 and 52 together where engaging surfaces of the elements 50 and 52 inhibit rotation about pin 9. In the embodiment illustrated, the lever 25 is incorporated as part of a foot rest extension 25. However, if desired the lever 25 can be located at any convenient position such as behind hand grip 26 as indicated above, where for example, a flexible cable extends from the lever 25 to rod or cable end 53. However, if desired, the locking device may be actuated in an electro-mechanical way, so that the actuating member, for example comprising a push button switch, controls electrical energy to an electric solenoid or the like that is configured to release and engage selectively engagable elements of the locking device.

On its lower side the rear frame part 2 carries a stand 27 providing a stable support for the scooter both in the position of use and in the collapsed position. The stand 27 is attached to the rear frame part 2 at a position just behind the rotary axis 9.

The housing 23 partly encloses the electric motor 8 and fully encloses the batteries for powering the electric motor 8. Preferably the batteries are such or are provided with such equipment that the batteries can be charged by connecting them to the mains supply so that it is easy to charge the batteries at home or at the final destination.

The rear wheel suspension 5 includes a one-sided rear fork (not shown) which is positioned on the same side as the front wheel suspension 15, that is on the side facing away from the folding direction. This means that the front and rear wheel suspensions 5, 15 will not hinder a compact collapse of the frame parts 1, 2. This compact collapsing of the frame parts is also not hindered by a front wheel mudguard 28 and a rear wheel mudguard 29 which are attached to the front and rear wheel suspensions 15, 5 on one side too, while they both cover the front and rear wheel in a portion at the rear half of the respective wheel so that in the collapsed position of the scooter they are in a different circumferential portion of the wheels 4, 7 enabling a close relative position of the front and rear wheels.

The transmission 6 for the rear wheel 7 can include includes one or more transmission elements transmitting the rotation of an output shaft of the electric motor 8 to the axle of the rear wheel 7. In order to allow for a large transmission ratio without unduly enlarging the transmission wheel, for example sprocket wheel, on the rear wheel 7, in one embodiment, a two step transmission 56 can be used as illustrated in FIG. 20. The transmission 56 includes a first endless transmission element 58 such as a belt or chain between a transmission wheel 60 coupled to the motor 8 and an intermediate transmission wheel 62. A second transmission element (e.g. belt or chain) 64 couples the intermediate transmission wheel 62 with a rear transmission wheel 66 coupled to rear wheel 7. The transmission ratio of each endless transmission element should be larger than one. Also illustrated in FIG. 20 is a brake assembly 65 operable with hub 67 and tensioning assemblies 71 and 73.

In order to allow for the nesting of the front and rear frame parts 1, 2, and in this case for the steering arrangement 3 and the box-shaped housing 23, the box-shaped housing 23 is shaped such as to allow the front frame beam 10 to be positioned between the housing 23 and the rear wheel 7. For this purpose the housing 23 has a recess 30 accommodating the front frame beam 10 in the collapsed position of the scooter. The rear side of the flat front fork 13 is positioned at a distance from the vertical rotary axis 9 which is slightly larger than the distance between the rotary axis 9 and the rear side of the housing 23, so that in the collapsed condition the front fork 13 fits just behind the housing 23 of the rear frame part 2 (see for example FIG. 10).

The collapsing of the scooter from the position of use to the collapsed position will be discussed with reference to FIGS. 6-14.

Figure 6:
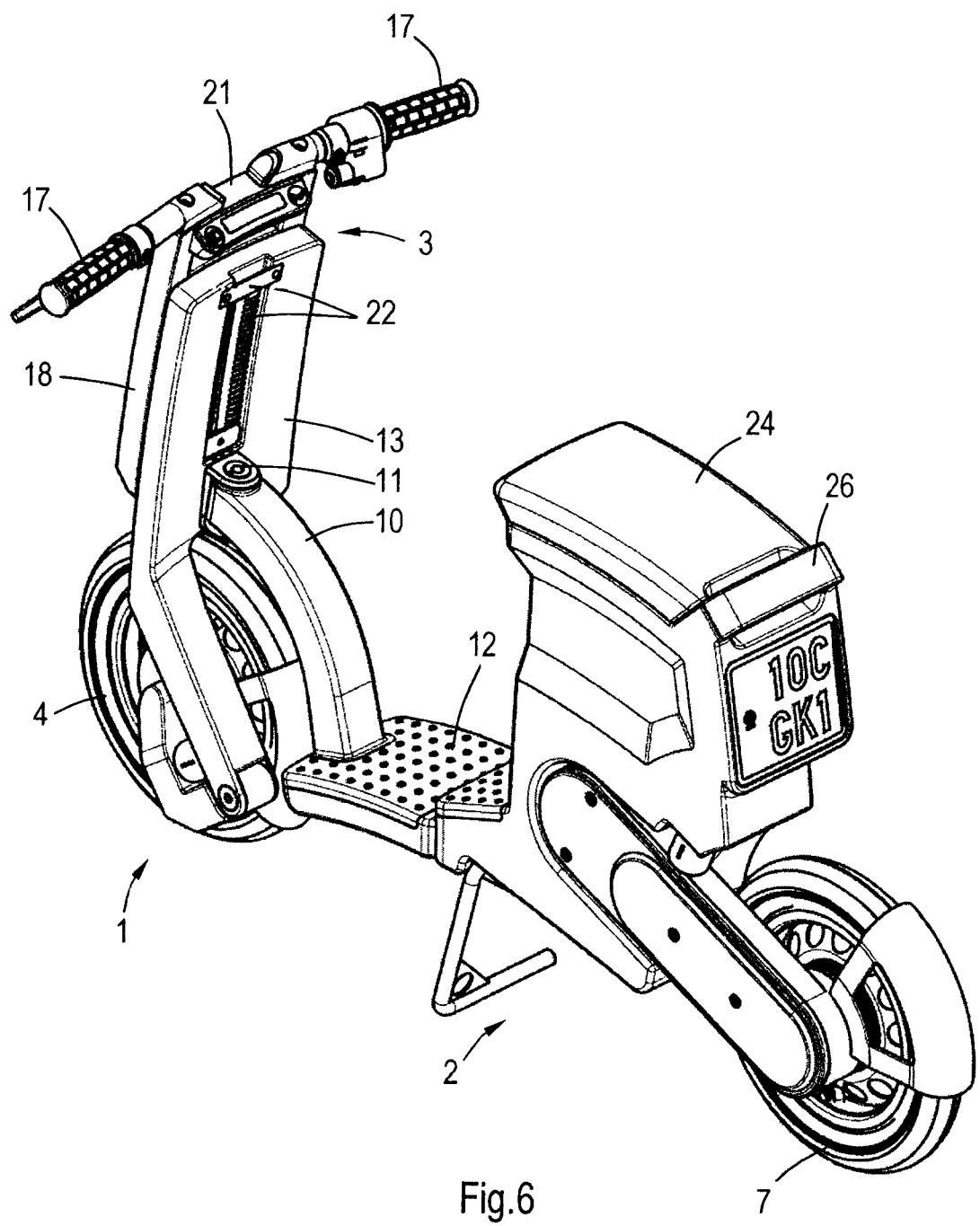
FIG. 6 is a view corresponding to that of FIG. 1, but showing the scooter with the handle bars in a downwardly displaced position.

In FIG. 6 the handle bar support 18 is moved downwardly with respect to the front fork 13 to collapse the scooter in vertical direction. During this downward movement through the height adjustment mechanism 22, the handle bar support 18 has locked the steering arrangement 3 with respect to the front frame part 1, so that the front wheel 4 is locked in its central position in which it is aligned with the rear wheel 7. The scooter is preferably placed on the stand 27, the central gravity of the scooter being positioned behind the stand 27, so that the scooter will rest on the stand 27 and the rear wheel 7. In a next step the locking device 48 between the front and rear frame parts 1, 2 is operated so as to release the selectively engagable elements 50, 52. While holding the rear hand grip 26 and one of the handle bars 17 or the hand grip 21, the front frame part 1 and the steering arrangement 3 are pivoted as a unit around the vertical rotary axis 9 so as to fold the front and rear frame parts 1, 2.

Figure 7:
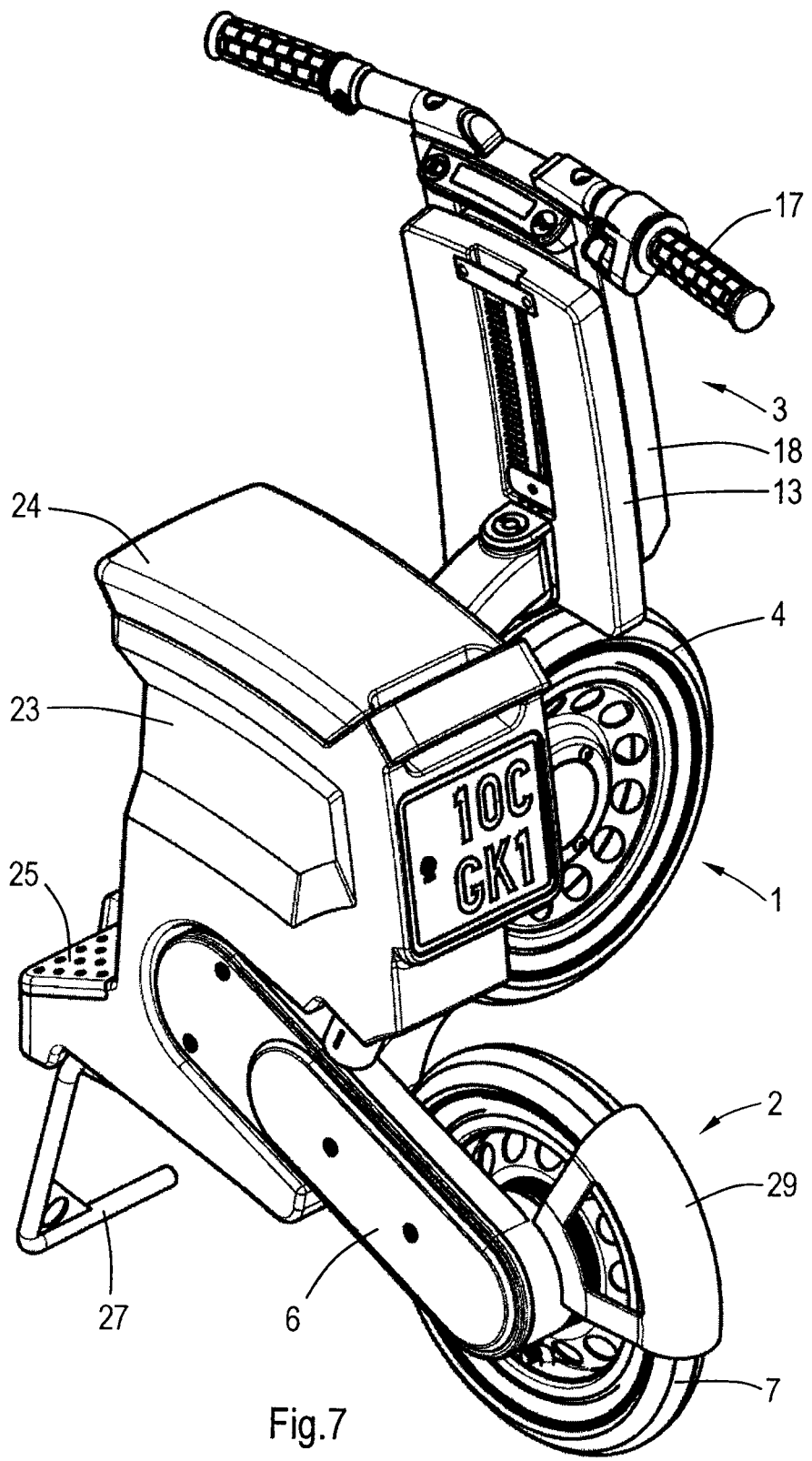
FIGS. 7 and 8 are views corresponding to those of FIGS. 1 and 2, but showing the scooter during collapsing.
Figure 8:
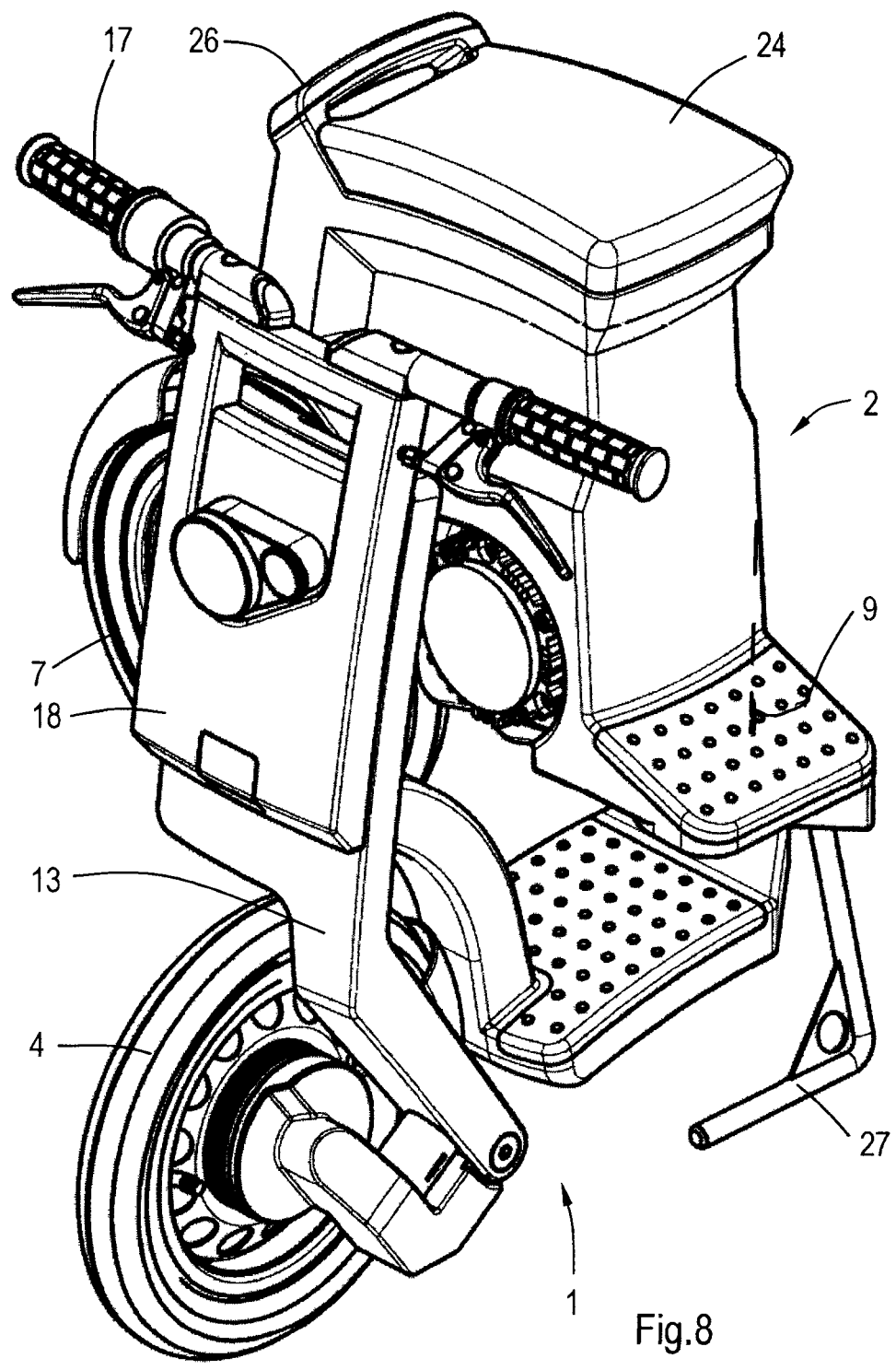

FIGS. 7 and 8 show the front frame part 1 in a 90° position halfway of the complete folding movement.

Figure 9:
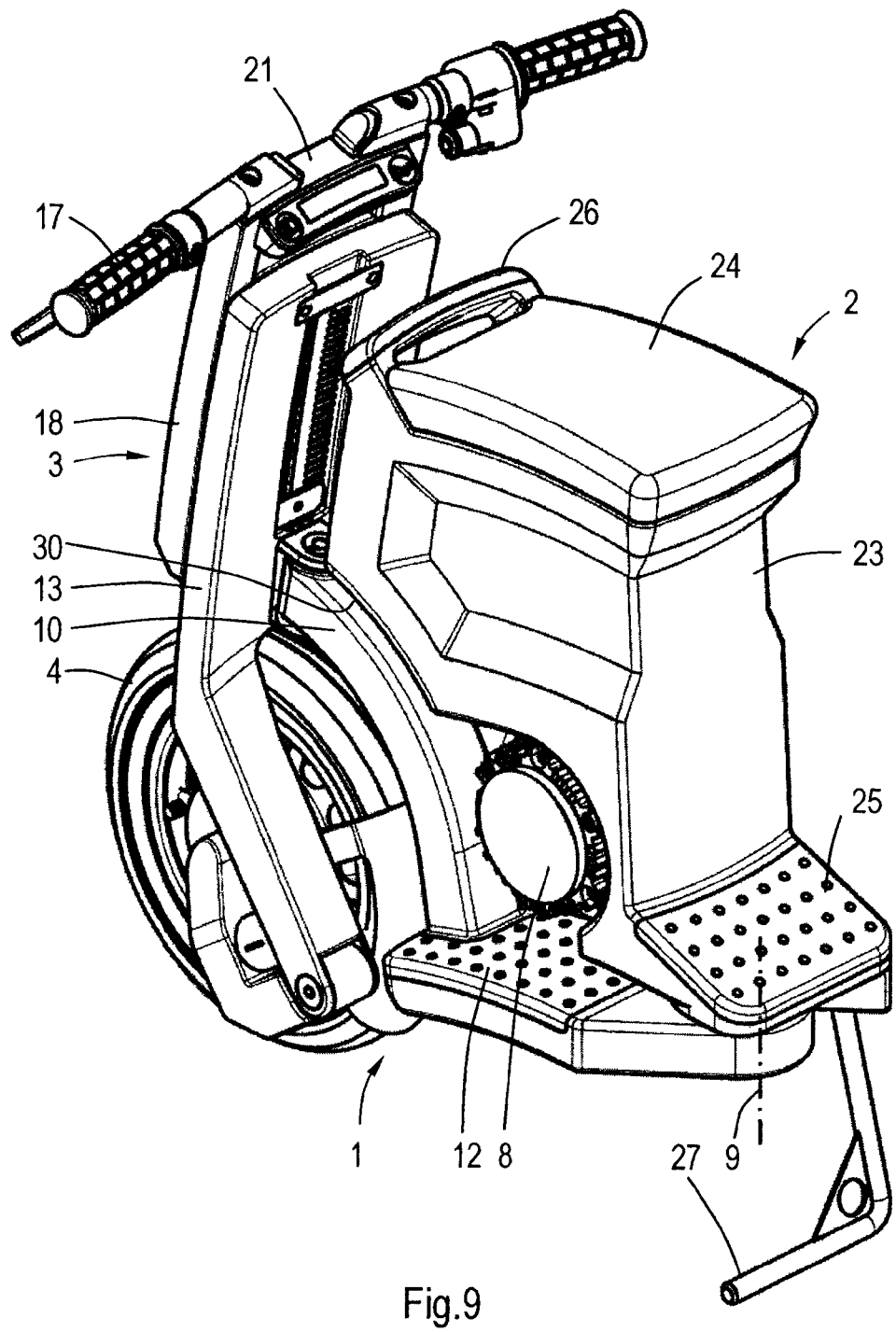
FIG. 9 is a view corresponding to that of FIG. 1, but showing the scooter in the collapsed position in which it can be used as a seat.
Figure 23:
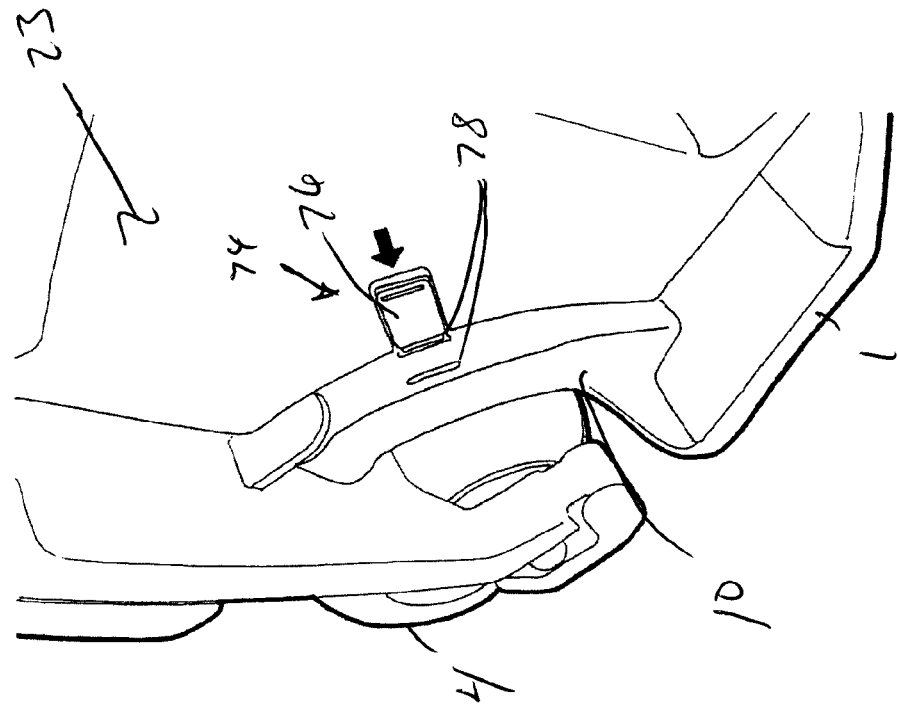
FIGS. 23 and 24 are schematic views of a locking device for selectively locking frame parts in a collapsed or nested position.
Figure 24:
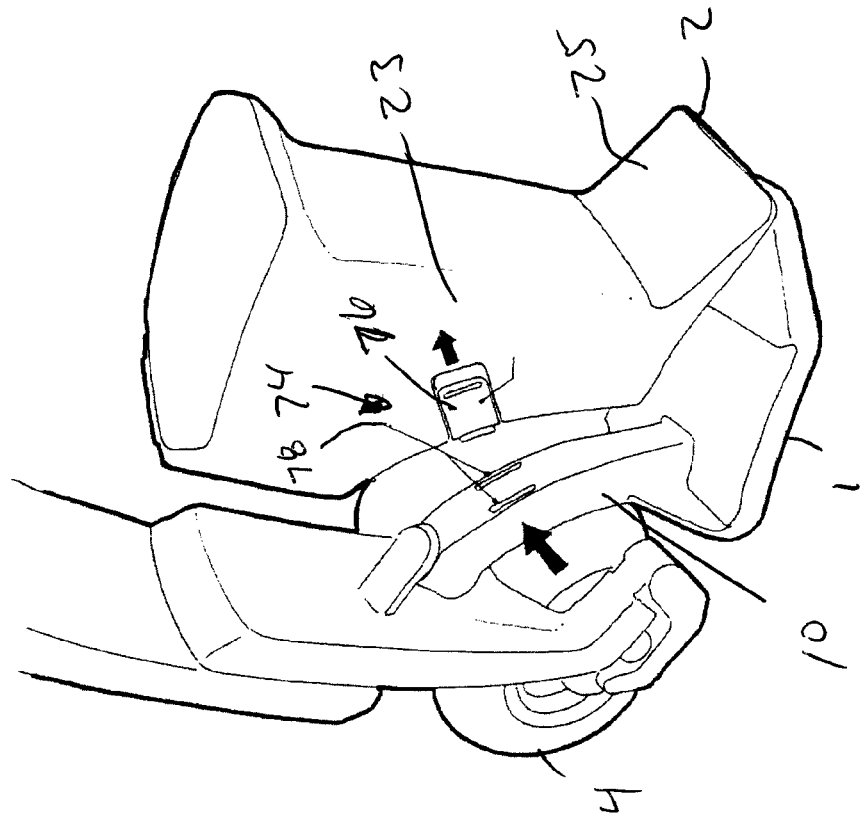

FIG. 9 shows the scooter in its completely folded position in which the front and rear wheels 4, 7 are positioned parallel and close to each other with their axles aligned, or at least proximate to each other. In the nested position, it may also be desirable to lock the frame parts 1 and 2 to each other for transport or so that the scooter may be used as a seat, where the flat and large seat 24 provides a comfortable place to sit on, while the scooter is standing on the stand 27 and the front and rear wheels 4, 7 in a stable manner. Various types of fasteners or locking devices can be used. In a first embodiment illustrated in FIGS. 21 and 22, the axles of the wheels 4 and 7 may be provided with a snap lock 70 that includes complementary engaging elements herein a receiving cup 72 secured to one of the wheels 4 or 7 that receives a protruding pin 74 mounted to the other wheel. Another form of locking device 74 or fastener is illustrated in FIGS. 23 and 24. In this embodiment, the locking device 74 includes a sliding plate 76 herein exemplary mounted to the housing 23 and hence rear frame part 2, which comes into alignment with at least one aperture 78 provided on the front frame part 1 (herein portion 10) in the nested position. Other forms of a locking device having selectively engagable elements disposed at other positions on or otherwise connected to the front frame part 1 and the rear frame part 2 can be used. Likewise, strap(s) can be used. If desired, the locking device 48 can be used where the elements 50 and 52 can be configured such that they can engage each other to hold the scooter in the nested position as well as the aligned, operative position.

As is shown in FIG. 9, the platform shaped foot rest 12 is positioned partly below the foot rest extension 25 and the housing 23 of the rear frame part 2. It is also positioned close to the exposed portion of the electric motor 8 and it projects sideways beyond the electric motor 8 thereby providing protection against accidental contact with the hot parts of the electric motor 8 during handling of the scooter or when somebody is sitting on the seat 24. The front frame beam 10 extends just behind the motor and in the recess 30 between the housing 23 and the rear wheel 7.

Figure 12:
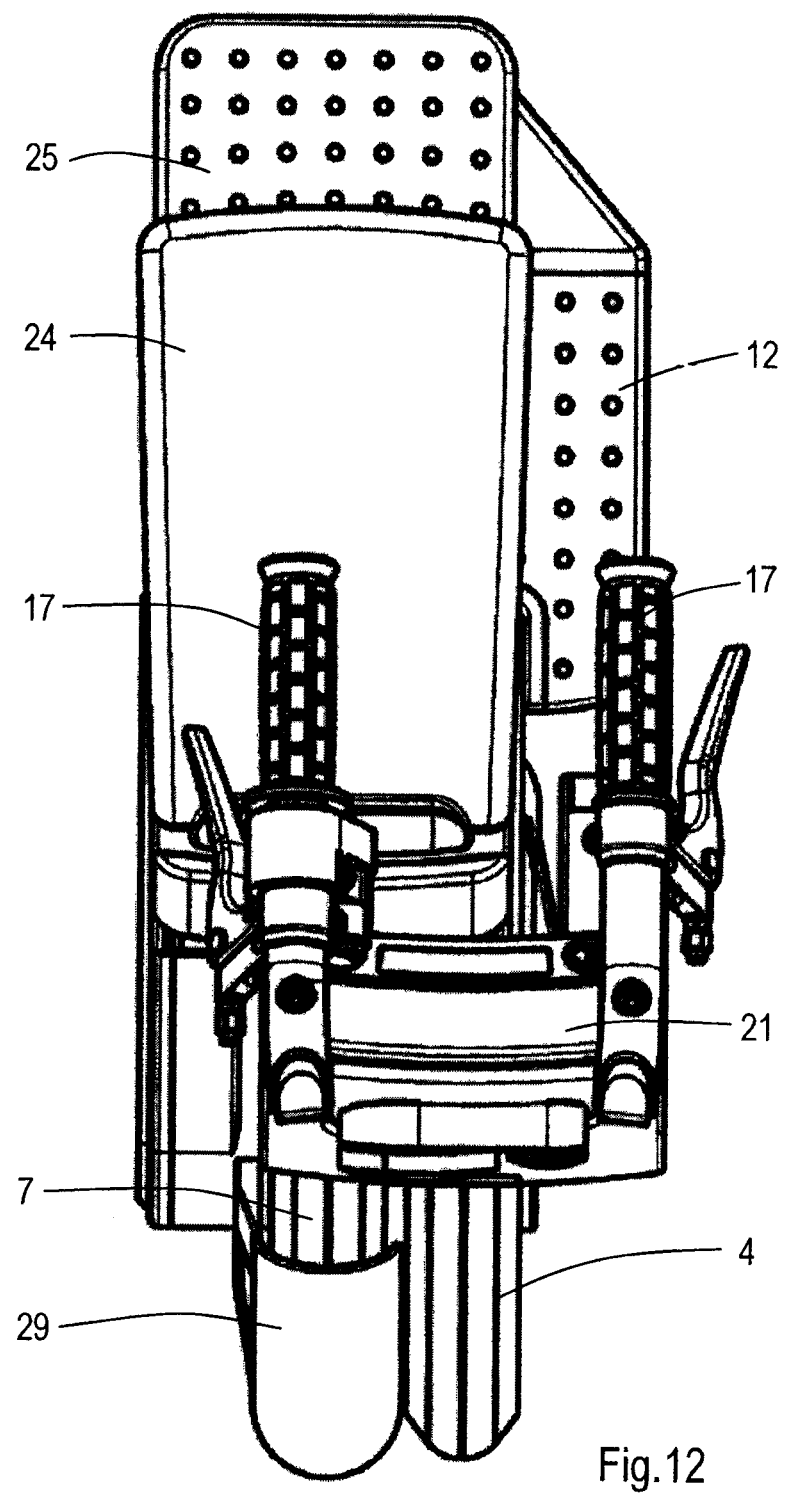
Figure 13:
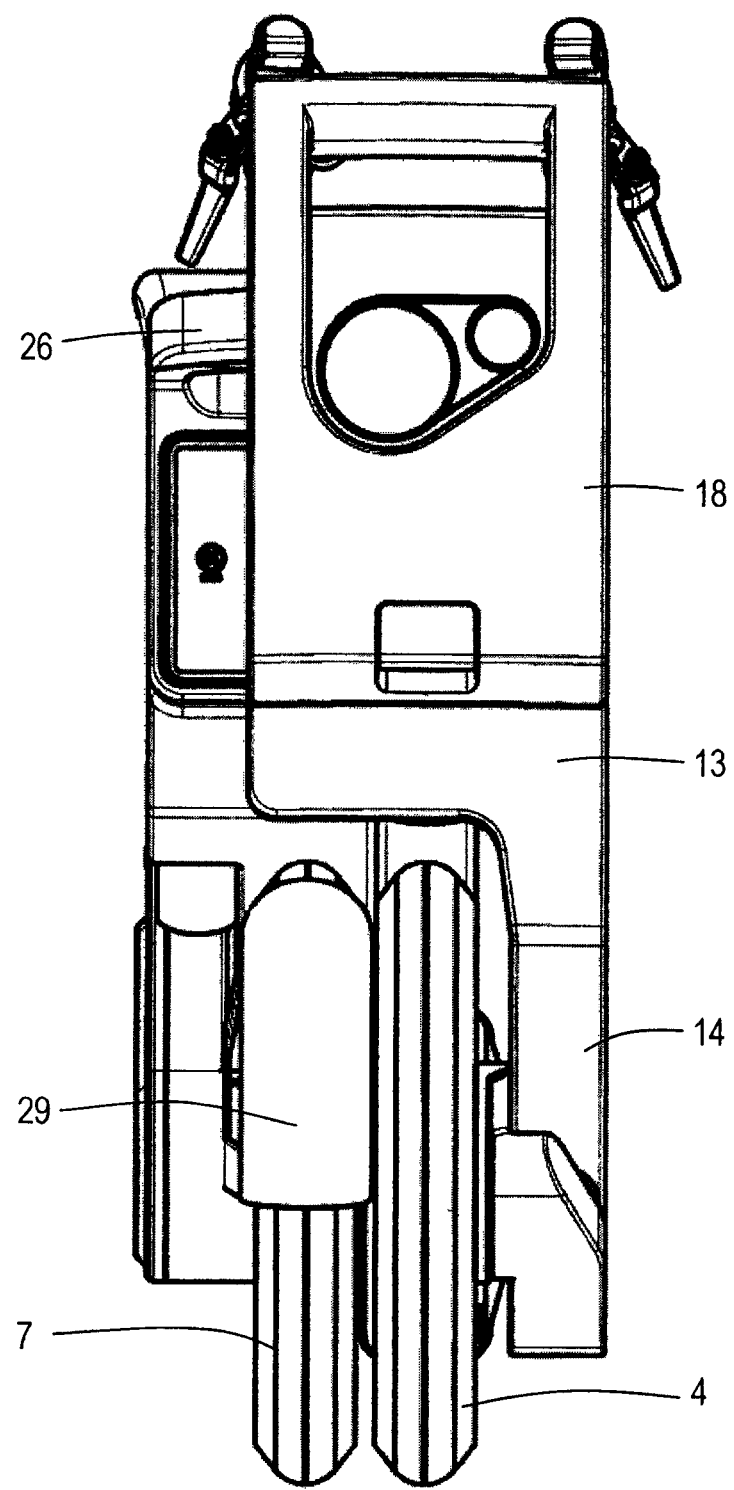
Figure 14:
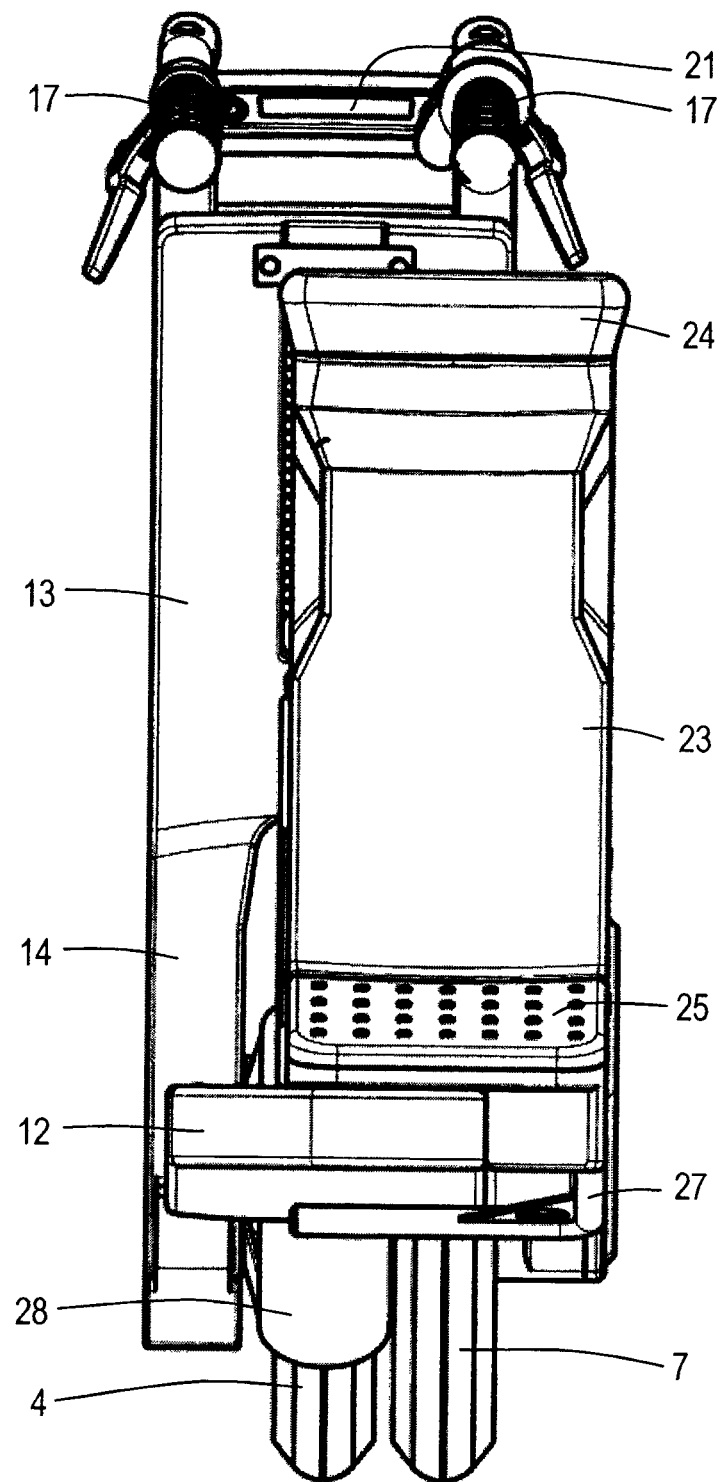

In the position according to FIGS. 10-14, the handle bars 17 are pivoted inwardly to extend within the width of the collapsed scooter and FIG. 12 shows that the width of the collapsed scooter is approximately 1.5 times the width of the scooter in the position of use (excluding the handle bars), so that the nesting of the front and rear frame parts 1, 2 substantially reduces the size of the scooter in the collapsed condition. In this position, the scooter may be gripped by the hand grip 21 between the handle bars 17, in order to incline the collapsed scooter forwardly so as to roll the collapsed scooter on one or two wheels 4,7 in order to displace it in a comfortable manner.

If the rear wheel transmission 6 is provided with a free wheel clutch that allows for free forward and reverse rotation of the rear wheel 7 when the motor 8 is not engaged it is possible to roll the scooter on two wheels. The center of gravity of the scooter will be chosen such that in this collapsed position the center of gravity is substantially between the front and rear wheels 4, 7 in a lateral direction. The scooter will then show a stable behavior when the scooter is rolled on its two wheels 4, 7.

If the scooter is not provided with such a free wheel clutch in the transmission, rolling of the scooter in the collapsed position can be allowed by ensuring that in the inclined position of the scooter it is resting on the front wheel 4 only. This can be accomplished by allowing the front wheel 4 to project slightly beyond the rear wheel 7 (in the forward direction) in the collapsed or nested condition so that the axles of the wheels 4, 7 are out of alignment. The scooter will then be resting on two wheels 4, 7 when the scooter is resting on its stand 27, but in the forwardly inclined position, the scooter will be resting on the projecting front wheel 4 only. Another way of obtaining the situation that the collapsed and forwardly tilted scooter is resting on its front wheel only 4 is by selecting the position of the rotary axis 9 and the spring characteristic of the front and rear wheel suspension 15, 5 properly, so that the front wheel 4 projects downwardly beyond the rear wheel 7. The spring characteristics are preferably such that both wheels 4, 7 are resting on the ground when the scooter is loaded in collapsed position, especially when a person uses the collapsed scooter as a seat. This promotes stability of the scooter during this use.

In this embodiment, the center of gravity should be offset more towards the front wheel 4 in the collapsed position of the scooter. This positioning of the center of gravity in the collapsed position may cause the center of gravity to be offset with respect to the center line of the scooter in the position of use, but this will hardly be a problem, because the user has a much larger weight than the weight of the scooter, so that the user mainly determines the total center of gravity, and not the scooter itself. In the embodiment shown, the scooter may have a weight between 12 and 20 kilograms.

From the foregoing it will be clear that the invention provides a means of transport which looks like the very popular scooter but allows compact folding of the scooter and thereby making the scooter very useful in a mixed transport of individuals.

The invention is not limited to the embodiment shown in the drawings and described above and may be varied in different manners within the scope of the appended claims. Furthermore, the scooter will comprise parts not described and/or shown in order to meet the respective legal requirements. These requirements may differ from country to country, and include brakes, lighting, license plates etc.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims and can be varied in a number of ways within the scope of the claims.

What is claimed is:

1. A motorized foldable scooter having a frame with a footrest, at least a front and rear wheel connected to the frame, a seat member supported by the frame, a steering arrangement supported by the frame and coupled to the front wheel, and a motor and transmission configured to drive the rear wheel, the frame having at least front and rear frame parts movably connected through a substantially vertical rotary axis to move the front and rear frame parts between an extended position of use and a collapsed position, the extended position of use being when the scooter is configured to be ridden, and wherein at least the front and rear frame parts are shaped such with respect to each other and the rotary axis that the front and rear frame parts remote from the rotary axis at least partly nest in a lateral direction of the scooter when the front and rear frame parts are in the collapsed position, and a lock configured to lock the front and rear frame parts in the extended position, wherein the rear frame part comprises a hand grip behind the seat member, and an actuating member for actuating the lock being arranged below the hand grip.

2. The scooter according to claim 1, wherein the scooter has one or more of the following features:
   the foot rest is disposed between the seat member and the steering arrangement on the front frame part, the rotary axis being positioned adjacent the foot rest and a portion of the foot rest being below the rear frame part in the collapsed position of the front and rear frame parts;
   the front and rear wheel are suspended to the frame through a suspension which is positioned on one side of each corresponding wheel only, which said one side faces away from a folding direction;
   the wheels being parallel to each other in the collapsed position;
   the seat member being provided on a box-shaped housing containing the motor, and the steering arrangement having handle bars arranged on a handle bar support connecting the handle bars to the wheel suspension, said handle bar support being flat in a longitudinal direction of the scooter and fitting behind the box-shaped housing in the collapsed position; and
   the rotary axis being positioned outside a longitudinal center line of the scooter, while the motor is positioned such that in the collapsed position a center of gravity of the scooter in a lateral direction is positioned substantially between the wheels.

3. The scooter according to claim 1, wherein the seat member is substantially flat and rectangular and provides a seat in the collapsed position.

4. The scooter according to claim 1, wherein the steering arrangement is provided with a locking device locking the steering arrangement in a central position to facilitate collapsing, the handle bars of the steering arrangement being adjustable up and down, and the locking device being actuated by an up and down movement of the handle bars.

5. The scooter according to claim 1, wherein the transmission of the driven rear wheel has a freewheel clutch that allows for free forward and reverse rotation of the rear wheel when the motor is not engaged and, the steering arrangement having a grip between the handle bars in the collapsed position of the scooter.

6. The scooter according to claim 1, wherein axes of the wheels are aligned in the collapsed position of the wheels, the wheels having wheel axles including snap locks to lock the wheels together and thereby the front and rear frame parts in the collapsed position.

7. The scooter according to claim 1, wherein the transmission includes two endless transmission elements, which are arranged in series and each connect transmission wheels of different diameters.

8. The scooter according to claim 1, wherein each wheel is provided with a mudguard, the mudguards being dimensioned and arranged such that the mudguards are free from an overlap in circumferential direction when the scooter is in the collapsed position.

9. The scooter according to claim 1, wherein a portion of the motor to be cooled is exposed to a side of the scooter and wherein, in the collapsed position of the scooter, the front frame part is positioned adjacent to the portion of the motor and projects sideways away from the portion of the motor.

10. A motorized foldable scooter having a frame, at least a front and rear wheel connected to the frame, a seat member supported by the frame, a steering arrangement supported by the frame and coupled to the front wheel with a front fork, and a motor and transmission configured to drive the rear wheel, the frame having at least front and rear frame parts movably connected through a substantially vertical rotary axis to move the front and rear frame parts between an extended position of use and a collapsed position, the extended position of use being when the scooter is configured to be ridden, wherein the front fork of the steering arrangement and the seat member are shaped such with respect to each other and the rotary axis that they at least partly nest in a lateral direction of the scooter when the front and rear frame parts are in the collapsed position in which the scooter rests on the front and rear wheels which are parallel and close to each other and on a stand which is attached to the frame, and wherein the seat member is attached to the rear frame part and rotates with the rear frame part about the rotary axis.

11. The scooter according to claim 10, wherein the seat member is substantially flat and provides a seat in the collapsed position.

12. A motorized foldable scooter having a frame with a footrest, at least a front and rear wheel connected to the frame, a seat supported by the frame, a steering arrangement supported by the frame and coupled to the front wheel, and a motor and transmission configured to drive the rear wheel, the frame having at least front and rear frame parts movably connected through a substantially vertical rotary axis to move the front and rear frame parts between an extended position of use and a collapsed position, the extended position of use being when the scooter is configured to be ridden, wherein the footrest comprises a platform fixedly secured to at least one of the front and rear frame parts, and wherein the front and rear frame parts are shaped such with respect to each other and the rotary axis that the front and rear frame parts remote from the rotary axis at least partly nest in a lateral direction of the scooter when the front and rear frame parts are in the collapsed position, wherein the front and rear wheels are each suspended to the frame through a corresponding suspension which is positioned on one side of each corresponding wheel only which is facing away from a folding direction of the front and rear frame parts, and wherein the front and rear wheels are parallel and close to each other in the collapsed position of the front and rear frame parts.

13. A motorized foldable scooter having a frame, at least a front and rear wheel connected to the frame, a seat supported by the frame, a steering arrangement coupled to the front wheel, and a motor and transmission configured to drive the rear wheel, the frame having at least front and rear frame parts movably connected through a substantially vertical rotary axis to move the front and rear frame parts between an extended position of use and a collapsed position, the extended position of use being when the scooter is configured to be ridden, and wherein the steering arrangement and the seat, and/or the front and rear frame parts are shaped such with respect to each other and the rotary axis that the steering arrangement and the seat, and/or the front and rear frame parts at least partly nest in a lateral direction of the scooter when the front and rear frame parts are in the collapsed position wherein the scooter has a platform-like foot rest between the seat and the steering arrangement on the front frame part, the rotary axis being positioned such that a portion of the foot rest of the front frame part is positioned below the rear frame part in the collapsed position of the front and rear frame parts.

14. The scooter according to claim 13, wherein the foot rest includes an extension on the rear frame part, a portion of the front frame part being positioned below the extension of the rear frame part in the collapsed position of the front and rear frame parts.

15. A motorized foldable scooter having a frame, at least a front and rear wheel connected to the frame, a seat supported by the frame, a steering arrangement supported by the frame and coupled to the front wheel, and a motor and transmission configured to drive the rear wheel, the frame having at least front and rear frame parts movably connected through a substantially vertical rotary axis positioned outside a longitudinal center line of the scooter to move the front and rear frame parts between an extended position of use and a collapsed position, the extended position of use being when the scooter is configured to be ridden, and wherein the front and rear frame parts are shaped such with respect to each other and the rotary axis that only some portions of the front and rear frame parts at least partly overlap in a lateral direction of the scooter only when the front and rear frame parts are in the collapsed position, and wherein axes of the front and rear wheels are substantially aligned with each other and the front and rear wheels are positioned parallel and close to each other in the collapsed position of the front and rear frame parts.

16. The scooter according to claim 15, wherein the axes of the wheels are aligned in the collapsed position of the wheels, the wheels include wheel axles having snap locks to lock the wheels together and thereby the front and rear frame parts in the collapsed position.

17. A motorized foldable scooter having a frame, at least a front and rear wheel connected to the frame, a seat supported by the frame, a steering arrangement coupled to the front wheel, and a motor and transmission configured to drive the rear wheel, the frame having at least front and rear frame parts movably connected through a substantially vertical rotary axis to move the front and rear frame parts between an extended position of use and a collapsed position, the extended position of use being when the scooter is configured to be ridden, and wherein the steering arrangement and the seat, and/or the front and rear frame parts are shaped such with respect to each other and the rotary axis that they at least partly nest in a lateral direction of the scooter when the front and rear frame parts are in the collapsed position, wherein the front frame part comprises a front frame beam substantially following the curvature of the front wheel and being attached to the steering arrangement, the seat being provided on a box-shaped housing of the rear frame part, the housing having a recess accommodating the front frame beam in the collapsed position of the front and rear frame parts.

18. The scooter according to claim 17, and further comprising a wheel suspension coupling the front frame part to the front wheel, wherein the steering arrangement has handle bars arranged on a handle bar support connecting the handle bars to the wheel suspension, said handle bar support being flat in a longitudinal direction of the scooter and fitting behind the box-shaped housing of the rear frame part in the collapsed position of the front and rear frame parts.

19. The scooter according to claim 1, wherein the scooter has one or more of the following features:
- the wheels being parallel to each other in the collapsed position; and
- the scooter having a stand which is attached to the rear frame part.

* * * * *